United States Patent
Leroy et al.

(10) Patent No.: US 12,396,433 B2
(45) Date of Patent: Aug. 26, 2025

(54) ANIMAL LITTER BOX INCORPORATING A CLEANING DEVICE

(71) Applicant: LEROY JCG, Lentilly (FR)

(72) Inventors: Jérémy Leroy, Lentilly (FR); Guillaume Servy, Lentilly (FR)

(73) Assignee: LEROY JCG, Lentilly (FR)

( * ) Notice: Subject to any disclaimer, the term of this patent is extended or adjusted under 35 U.S.C. 154(b) by 0 days.

(21) Appl. No.: 18/648,730

(22) Filed: Apr. 29, 2024

(65) Prior Publication Data

US 2024/0357991 A1    Oct. 31, 2024

(30) Foreign Application Priority Data

Apr. 27, 2023   (FR) .................................. FR2304295
Jul. 31, 2023   (FR) .................................. FR2308307

(51) Int. Cl.
*A01K 1/01* (2006.01)

(52) U.S. Cl.
CPC ................................... *A01K 1/011* (2013.01)

(58) Field of Classification Search
CPC .............................. A01K 1/0114; A01K 1/011
See application file for complete search history.

(56) References Cited

U.S. PATENT DOCUMENTS

| | | | | |
|---|---|---|---|---|
| 4,846,104 A | * | 7/1989 | Pierson, Jr. .......... | A01K 1/0114 209/235 |
| 5,259,340 A | * | 11/1993 | Arbogast ............. | A01K 1/0114 119/165 |
| 5,622,140 A | * | 4/1997 | McIlnay-Moe ...... | A01K 1/0114 119/166 |
| 7,628,118 B1 | * | 12/2009 | Nottingham ......... | A01K 1/0114 119/166 |
| 11,457,604 B1 | * | 10/2022 | Fan ...................... | A01K 1/0114 |
| 2008/0017123 A1 | * | 1/2008 | Chin ..................... | A01K 1/011 119/166 |
| 2011/0088630 A1 | * | 4/2011 | Krotts .................. | A01K 1/0114 119/166 |
| 2020/0060221 A1 | * | 2/2020 | Fan ...................... | A01K 1/0114 |

* cited by examiner

*Primary Examiner* — Yvonne R Abbott-Lewis
(74) *Attorney, Agent, or Firm* — CRGO Global; Steven M. Greenberg (57) ABSTRACT

The present invention relates to a litter box for pets, such as cats or rodents, including a cylinder in which the litter is placed, a means for separating the droppings from the litter and a remote, enclosed device for collecting the droppings. The animal litter box incorporates a cleaning device including the cylinder rotating on a frame, the rotation being generated by a rotation means actuated by a means for controlling the rotation means, the chamber including a means for collecting droppings coupled to a hatch provided with a locking and unlocking means interdependent on a means for controlling the unlocking of the hatch and a means for guiding the hatch coupled to the means for collecting droppings toward a tank for receiving droppings.

10 Claims, 7 Drawing Sheets

ANIMAL LITTER BOX INCORPORATING A CLEANING DEVICE

CROSS REFERENCE TO RELATED APPLICATIONS

This application claims priority under 35 U.S.C. § 119 (a) to French patent application FR2304295 filed on 27 Apr. 2023, and to French patent application FR2308307 filed on 31 Jul. 2023, the entire teachings of which are incorporated herein by reference.

BACKGROUND OF THE INVENTION

Field of the Invention

The present invention relates to a litter box for pets, such as cats or rodents, including a rotating cylinder in which the litter is placed, a means for separating the droppings from the litter and a remote, enclosed device for collecting the droppings.

Description of the Related Art

Traditionally, pet owners, particularly cat owners, provide litter boxes so that their pets can relieve themselves therein. These boxes have many drawbacks: the smell, the dispersion of litter outside the box when the animal scratches, and above all the need to empty and clean them very regularly.

To remedy this, closed devices leaving only an aperture for the animal to pass through, and incorporating a means of automated excrement collection, have been invented.

WO2012154175 describes a litter box apparatus consisting of a rotating cylindrical chamber in which litter is placed, and in which an aperture allows the animal to enter and exit. A rectangular screening drawer is integrated into the inside wall of the cylinder. When the cylinder performs a 360° rotation, the drawer passes through the litter; the droppings are retained in the screening drawer, while the filtered litter remains in the interior volume of the chamber. The drawer is then removed from the cylinder and emptied. However, the drawback of having the drawer in the cylinder is that it considerably reduces the space available for the animal. Also, the fact that the drawer is not closed poses hygiene problems, notably with regard to odors.

EP0297015, which describes a similar type of rotating chamber fitted with a harrow for filtering droppings, has a similar drawback, since the receptacle for collecting the droppings is inside the cylinder.

FR2693872 differs from the preceding documents in that it provides a collection tray outside the cylinder. When the cylinder performs its rotation, a harrow passes through the litter and collects the excrement. When the cylinder reaches a certain height, a lid coupled to the harrow tilts under gravity, dragging the harrow along with it. Finally, the excrement falls into the collection drawer. However, this tank is open, which again presents problems of hygiene and odor. And even with a lid, the excrement may not fall into it without manual intervention.

The proposed solutions thus simply defer the hygiene problem without really solving it, since with the proposed devices the droppings always remain in contact with the outside air and/or require frequent handling.

The present invention remedies all the shortcomings of the prior art devices by proposing an external, enclosed and removable excrement collection tank, and a means for collection and extraction of droppings interdependent on the tank.

BRIEF SUMMARY OF THE INVENTION

The purpose of the present invention is to propose a litter box which remedies all the drawbacks of the prior art.

The invention thus relates to an animal litter box incorporating a cleaning device including a cylindrical chamber intended to receive litter, perforated with a means of access for the animal, rotating on a frame, the rotation being generated by a rotation means actuated by a means for controlling the rotation means, the chamber including a droppings collection means coupled to a hatch provided with a locking and unlocking means interdependent on a means for controlling the unlocking of the hatch and a means for guiding the hatch coupled to the means for collecting droppings toward a tank for receiving droppings.

Advantageously, the tank includes a lid articulated on a hinge along one of its lengths and is provided with an aperture guide along the other length, the guide being located on the axis of rotation of the means for locking and unlocking the hatch and being pushed by the latter when they come into contact so as to lift and open the tank lid.

According to a preferred embodiment, the frame is provided with a means for controlling the locking of the hatch locking and unlocking means, the locking and unlocking means being moreover provided with an additional locking means.

Preferentially, the droppings collection means includes litter passage means complemented by a means for modulating the width of the litter passage means.

According to a variant, the litter box includes a covering and transport means.

Advantageously and according to the invention, the rotation means include at least one cylindrical support with an axis of rotation parallel to the axis of rotation of the cylinder, configured to support the cylinder and so that rotation of at least one cylindrical support results in rotation of the cylinder.

Advantageously and according to the invention, the means for controlling the rotation means are removable and the litter box is configured to allow manual changing of the means for controlling the rotation means between two rotations of the cylindrical chamber.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

In the figures, the scales and proportions are not strictly respected, for the purposes of illustration and clarity.

In addition, identical, similar or analogous elements are denoted by the same references throughout the figures.

FIGS. 1 to 6 schematically represent different views of a litter box according to a first embodiment of the invention.

According to this first embodiment of the invention, the litter box according to the invention consists in associating on a frame 1, on the one hand, a cylindrical chamber, referred to as rotating cylinder 2, designed to collect litter and animal droppings and to sort them by means of a system combining a harrow 3, forming a means for collecting the droppings, and a hatch 4, and on the other hand a tank 6 receiving the droppings, outside and adjoining the cylinder 2, fitted with a lid 5 whose opening and closing are interdependent on the rotation of the cylinder 2.

The frame 1 is rectangular in shape and is composed of a base 39, a front wall 7, a rear wall 8 and two side walls which may be defined, when facing the device, as a right-hand side wall 9 and a left-hand side wall 45.

Figure 1:
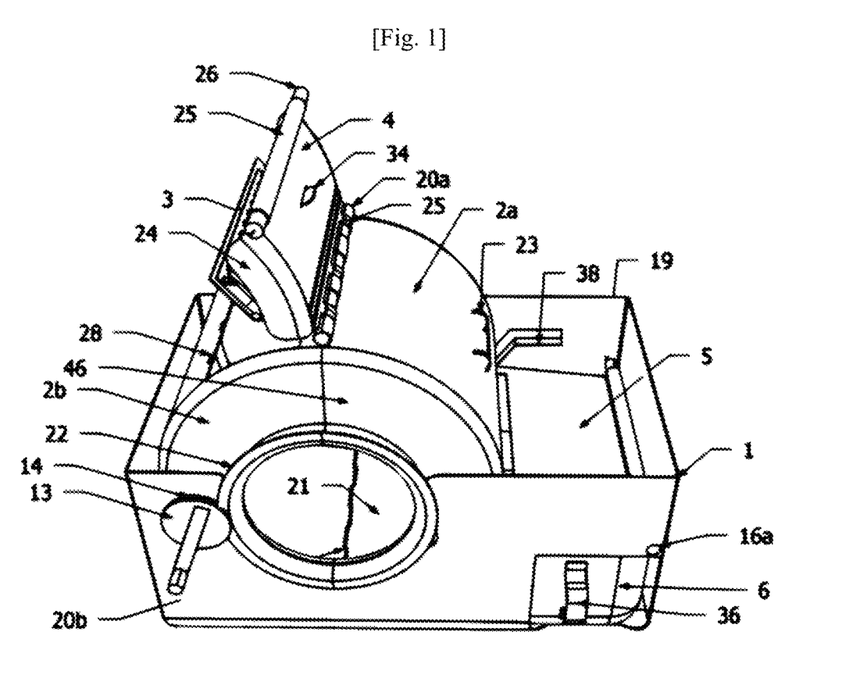
FIG. 1 represents a schematic front view of a frame and cylinder assembly of a litter box according to a first embodiment of the invention.
Figure 3:
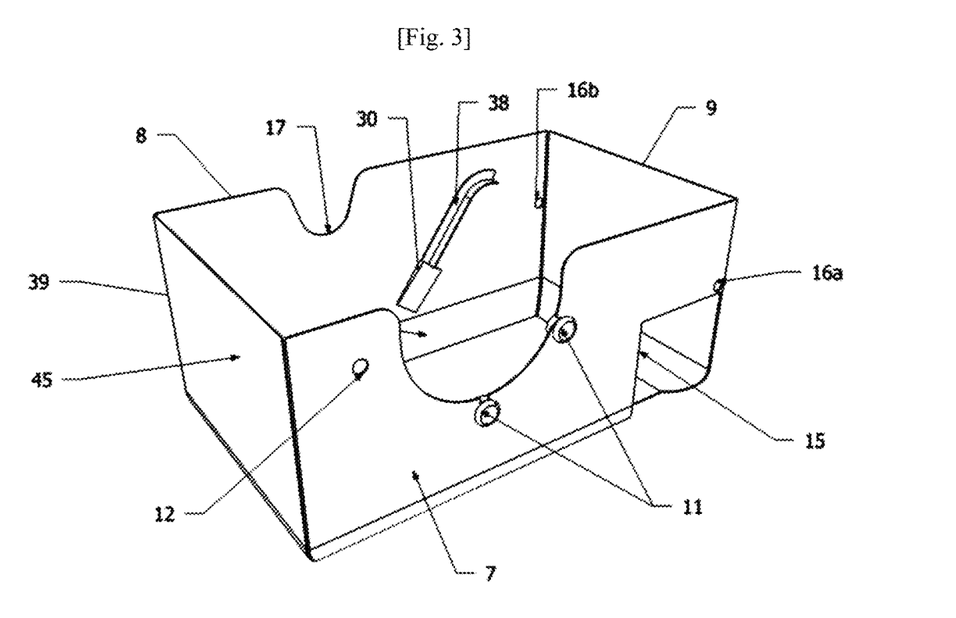
FIG. 3 represents a schematic front view of a litter box frame according to a first embodiment of the invention.

The front wall 7 includes a first semicircular cut-out 10 designed to support a front face 46 of the cylinder that will fit therein. This first cut-out 10 includes two semicircular notches in which two castors 11 will be fixed, allowing the cylinder to rotate. Close to the first cut-out 10 receiving the front face 46 of the cylinder is a hole 12 serving as a means for passage and attachment of a crank handle 13 forming a means for controlling the rotation means. This crank handle 13 will engage onto the front face 46 of the cylinder, which has an aperture 21, forming a means of access for the animal, the edges of which bend so as to constitute a pulley 22. When the cylinder is nested, pulley 22 protrudes from the frame. A rubber-covered crank handle roller 14, which forms a rotation means, then engages with pulley 22 and acts as a friction wheel: friction between the crank handle roller 14 and the cylinder 2 causes the latter to rotate. According to a variant, the crank handle roller 14 is replaced with a toothed wheel, and the inside of pulley 22 is also fitted with notches. The notches on the crank handle 13 engage with the notches on the pulley and thus cause the cylinder 2 to rotate.

The front wall 7 of the frame also has an aperture serving as a means 15 for passage of the tank. Immediately above, a first circular notch 16a serves as a means for passage and attachment of the hinge 19 of the tank lid 5.

According to other embodiments of the invention, the aperture serving as a passage means may be provided on another frame wall, in particular the rear wall or the right-hand side wall.

Figure 2:
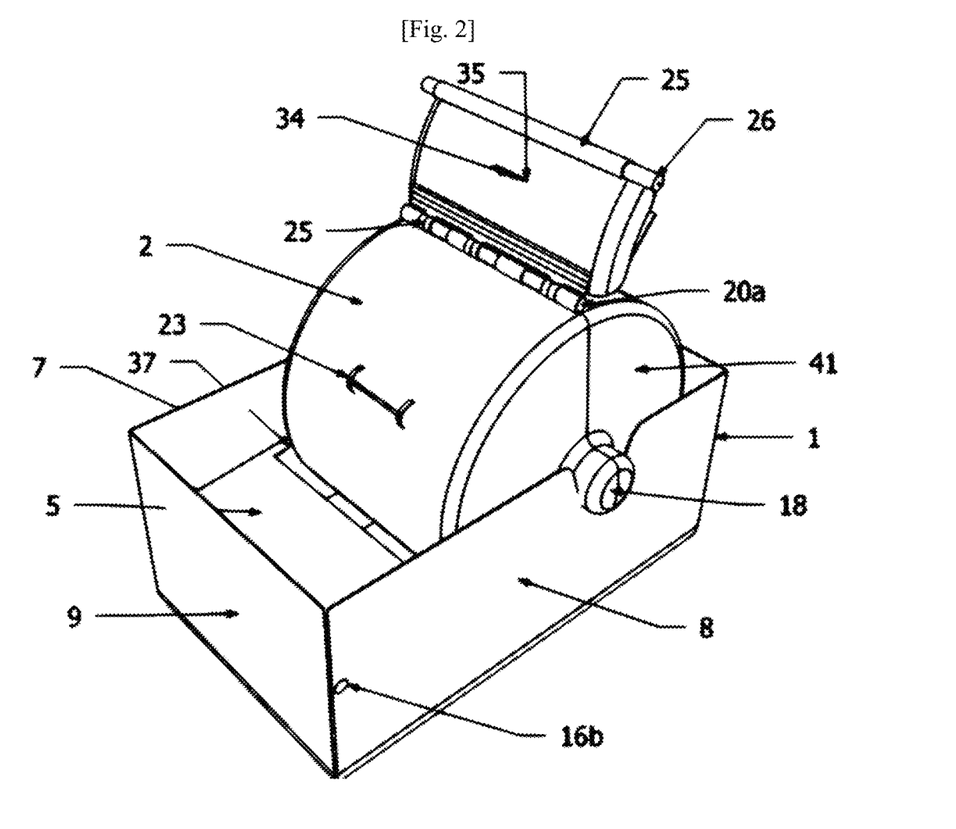
FIG. 2 represents a schematic rear view of a frame and cylinder assembly of a litter box according to a first embodiment of the invention.
Figure 4:
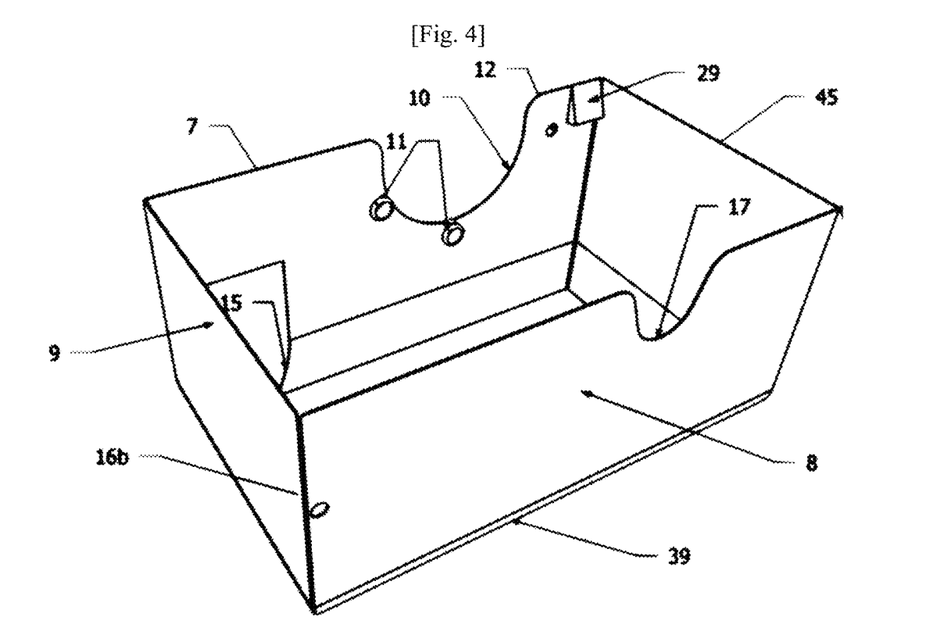
FIG. 4 represents a schematic rear view of a litter box frame according to a first embodiment of the invention.

The rear wall 8 of the frame also features a second semicircular cut-out 17, smaller than the one on the front wall 7 but located in its axis: this second cut-out 17 is intended to support and rotate the cylinder along an axis 18 of rotation and is located at the rear 41 of the cylinder. At the other end of the rear wall 8 is a second circular notch 16b serving as a means 19 for passage and attachment of the hinge of the lid of the tank 5, placed in the axis of the first notch 16a.

The cylinder 2 of the device according to the invention is composed of two half-cylinders 2a and 2b. They are connected by tubular hinges 20a and 26, the length of which corresponds to the width of the cylinder. On the rear 41 of the cylinder is the rotation axis 18, which is positioned on the second semicircular cut-out 17 on the rear face of the frame in this first embodiment. On the front of the cylinder 46 is a circular aperture 21 through which the pet enters to relieve itself in the litter, and then exits. The edges of this aperture are curved so as to create a pulley 22 which, on the one hand, makes it possible to secure the cylinder to the front wall 7 of the frame and, on the other hand, to engage the crank handle roller 14 so as to allow the cylinder to rotate. When in motion, the cylinder 2 is configured for 360° rotations. Preferably, the cylinder 2 is equipped with a handle 23 which enables it to be readily removed from the frame when it is to be totally emptied and cleaned.

Figure 5:
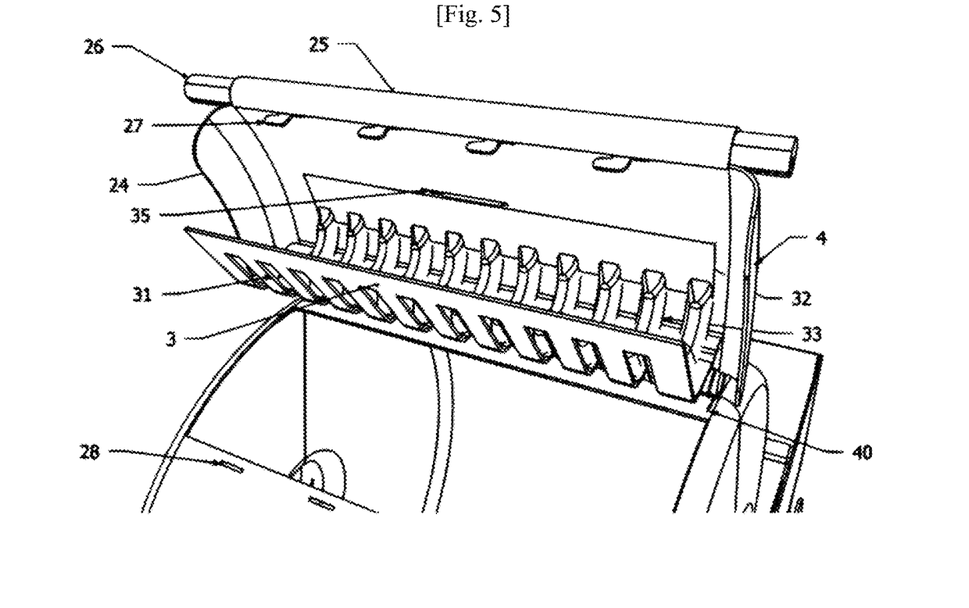
FIG. 5 represents a schematic view of a harrow of a litter box according to a first embodiment of the invention.

The cylinder 2 is equipped with a hatch 4 associated with a harrow 3 designed to extract animal excrement while at the same time conserving litter that has not been soiled. When the cylinder 2 is in its resting position, the hatch 4 is located on its top. The hatch 4 is rectangular in shape, slightly incurved to match the shape of the cylinder 2 and fit therein. On each of the widths of the hatch 4 are perpendicular walls 24 for hermetic closing. On each of its lengths, the hatch is connected to a hinge. The first hinge 20a connects the hatch 4 to the cylinder 2. The hatch 4 is attached to the hinge by means of fixing rings 25, which afford it rotational mobility, allowing it to be opened and closed. A return spring 40 is attached to this hinge 20a. It serves to close the hatch after it has been opened. The second hinge 26 is also held to the hatch 4 by means of fixing rings 25. This hinge projects slightly beyond the cylinder on either side. It is moreover equipped with small hooks 27, which constitute an additional locking means. These hooks 27 are elbow-shaped and allow the hatch 4, and consequently the cylinder 2, to be closed and to remain in the closed position for almost the entire rotation, even when the lid is under the litter and bearing its full weight. To ensure this closing, holes 28 are provided on the cylinder wall opposite the hooks 27. When the lid is closed, the hooks 27 will engage in the holes 28. When the cylinder begins to rotate counter-clockwise, the second hinge 26 including the hooks will drop down and meet, at the top of the front inner part of the frame 7, a first beveled part 29, the highest part of which is located toward the bottom of the front wall of the frame. When it encounters this first beveled part 29, the second hinge 26 is gradually pushed toward the rear wall of the frame 8, dragging with it the hooks 27 which finally lock against the inner wall of the cylinder. The lid will then be locked. The cylinder continues to rotate through about 200°. The rear part of the second hinge 26, which has been pushed in and protrudes slightly beyond the cylinder, will then meet a second beveled part 30, halfway up the rear inner part of the frame 8, the highest part of which is toward the top of the latter. The second beveled part 30 will then push the second hinge 26 toward the front wall of the frame 7, dragging with it the hooks 27 which will be released from the inner wall of the cylinder and become unblocked. The lid will then be unlocked. This unlocking movement also causes the harrow 3 to be jolted and makes excess filtered litter fall out. The second hinge thus forms a locking and unlocking means, interdependent with the second beveled part 30, which forms a means for controlling the unlocking of the hatch 4. The first beveled part 29 forms a means for controlling the locking of the second hinge. The small hooks 27 form an additional locking means.

In other embodiments, other solutions for locking and unlocking the hatch 4 are possible. In particular, the second hinge 26 may be replaced with a different system, for example a locking means arranged on the hatch and rotatable between a first position in which the hatch is locked and a second position in which the hatch is unlocked. Locking and unlocking is performed by interaction with guide means fixed to the frame, in particular a first guide means fixed to the left-hand side wall 45 allowing the hatch to be locked, and a guide means fixed to the right-hand side wall 9 of the frame, for example to a wall not shown separating the cylinder 2 from the tank 6.

In addition, in an embodiment similar to that shown with reference to FIGS. 1 to 6, the locking and unlocking means may have similar functions with differently shaped means: in particular, the second hinge may be replaced with a flat part including similar hooks for interaction with, for example, holes in the cylinder as described previously, or, for example, attachment parts fixed to the cylinder.

The harrow 3 is fixed under the hatch 4 and when the latter is closed, the harrow is inside the cylinder. The harrow 3 is welded to the hatch, and in its movement, the harrow is integral with the hatch. In its shape, the harrow 3 descends perpendicularly to the hatch 4 and then positions itself parallel thereto so as to constitute a jaw shape designed to collect droppings. Over its entire length, the harrow has apertures 31 which allow unsoiled litter to drain away. The apertures 31 thus form a litter passage means.

In order to be suitable for the size of the animal droppings, the harrow is covered with a grid 32 which follows the jaw shape constituted by the hatch 4 and the harrow 3 and fits therein, without being fixed thereto, so as to remain mobile. This grid 32 has apertures 33 similar to those of the harrow. This grid has, on its upper face, a rod 34 which will emerge from the hatch 4 through an aperture 35 provided for this purpose. This aperture is slightly wider than the rod 34, so that the latter can be handled by pushing it in the direction of the front wall of the frame 7 or in the direction of the rear wall of the frame 8. In so doing, the grid will move above the harrow and more or less cover the apertures thereof, the size of which it will modulate. The grid may be positioned so as to totally cover the apertures 31 of the harrow 3; the latter will thus be closed and capable of recovering all the litter during cleaning operations. The grid 32 thus forms a means for modulating the width of the apertures.

When the hatch 4 is closed and the cylinder 2 begins to rotate, the harrow is inside the cylinder. As it descends, it passes through the litter, which it filters. Droppings that are larger in size than the apertures 31 in the harrow will be retained between the hatch 4 and the harrow 3, and the unsoiled litter will be filtered and flow through the apertures 31 in the harrow to return to the bottom of the cylinder, where it will be reused. After this filtering phase, the cylinder continues to rotate and the hatch and harrow move upward, taking the droppings with them.

The tank 6 intended to receive the droppings is located inside the frame 1, along its right-hand side wall 9, and adjoins the cylinder 2. It is rectangular in shape, can be inserted into and removed from the frame by means of an aperture 15 provided for this purpose, and is fitted with a handle 36 on its front part, so that it can be manipulated more easily. The tank is covered with a movable lid 5 for improved hygiene and to prevent the spread of odors. The lid is attached to a hinge 19 along its length shared with the right-hand side wall 9 of the frame, which is fixed in the frame by means of two fixing notches 16a and 16b on the front wall 7 and rear wall 8 of the frame. On the other length of the tank lid, at the front, there is a small rectangular protrusion 37, forming an aperture guide.

When the cylinder 2 rises again after filtering the litter and just after the hatch 4 has been unlocked, the part of the hatch closing hinge 26 which is located toward the front wall of the frame 7 and protrudes slightly beyond the cylinder 2, will come up against this protrusion 37. The latter, blocked by the hinge, will be carried along by the cylinder's rotational movement and will rise, taking with it the entire lid 5 of the tank, which will open. At the same time, the rear end of the lid-closing hinge 26 will meet a cam 38 fixed to the rear wall of cylinder 8, positioned obliquely on this wall. The hinge 26 will be blocked by the cam 38, under which it will slide, causing the hatch to open completely. Constrained by the shape of the cam 38, under which it is forced to slide, the hatch will eventually tip over, dragging the harrow 3 with it. By gravity, the droppings fall into the tank 6, the lid 5 of which is then opened. Once the hatch has travelled along the entire length of the cam 38, it is released and folds back onto the cylinder, driven by the return spring 40, which is attached to the hinge 20a connecting the hatch 4 to the cylinder 2. When the hatch 4 folds back onto the cylinder 2, it releases the lid 5 from the tank 6, which falls back onto the latter and closes it again. The cylinder 2 then completes its rotation and stops when the hatch 4 returns to its initial position on top of the cylinder. The cam 38 thus forms a guide means for the hatch, coupled to the harrow.

Figure 6:
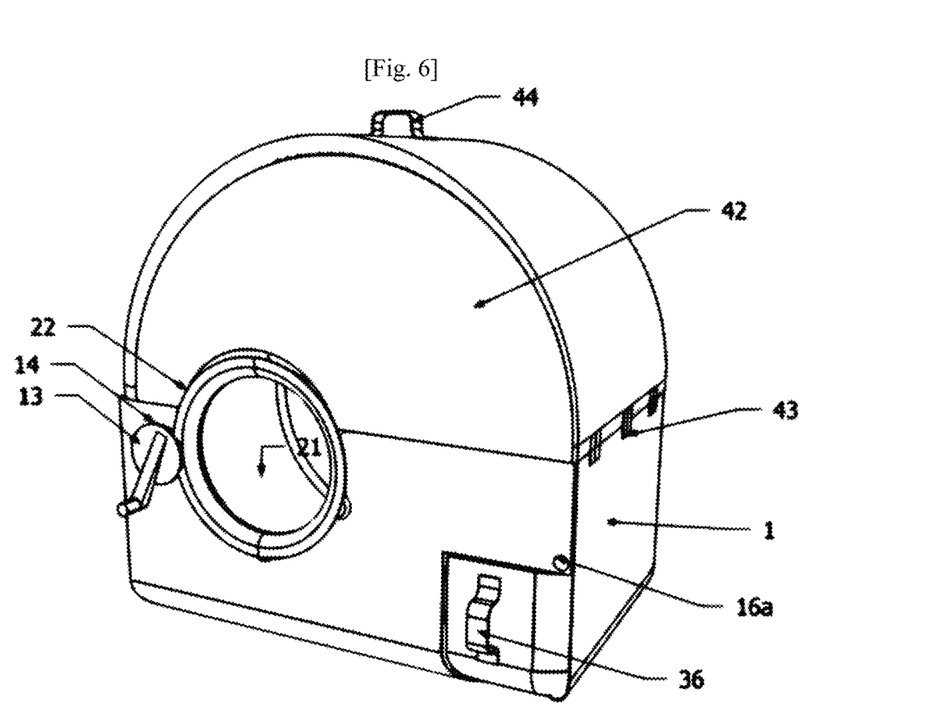
FIG. 6 represents a schematic front view of a litter box according to a first embodiment of the invention, with a lid.
Figure 7:
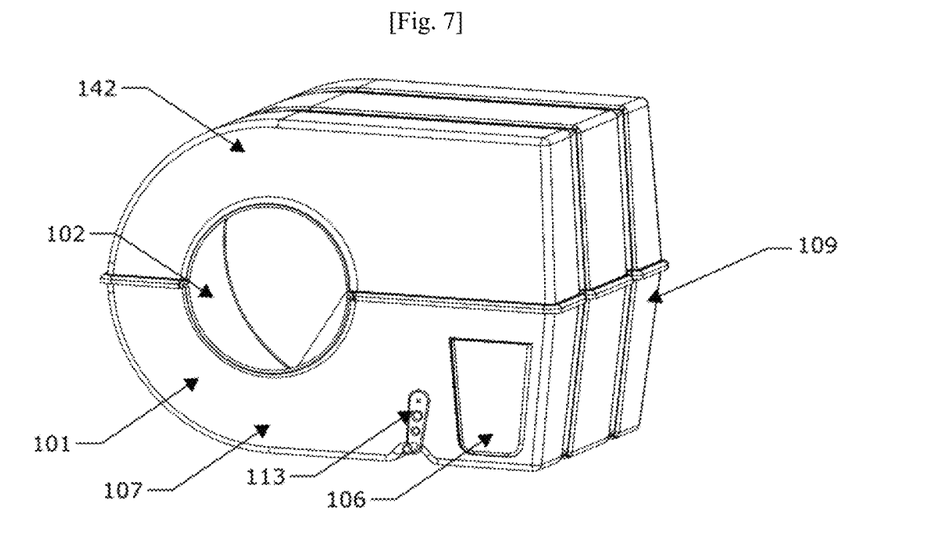
FIG. 7 represents a schematic perspective view of a litter box according to a second embodiment of the invention.
Figure 8:
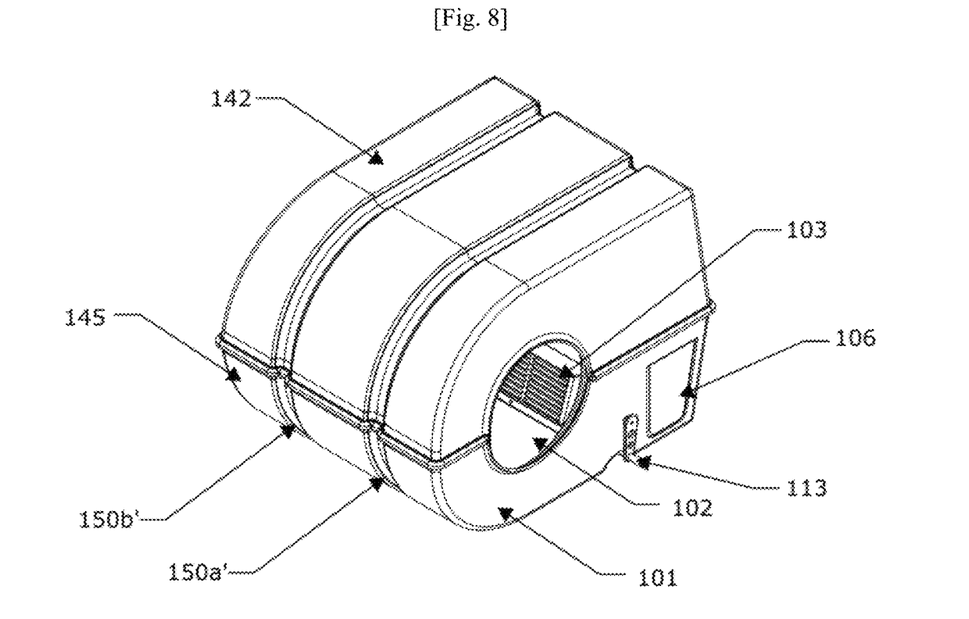
FIG. 8 represents a schematic perspective view of a litter box according to a second embodiment of the invention.

A lid 42 can be added to the device according to the invention, covering the entire device and forming a covering means, including a first notch on its front face which engages in the cylinder pulley 22 and a second notch on its rear face which engages in the axis of rotation 18, means 43 for attachment to the frame and a handle 44 at its top for moving the entire device, the handle 44 thus forming a means of transport.

FIGS. 7 to 10 schematically represent different views of a litter box according to a second embodiment of the invention. The general functioning of the litter box is the same as in the first embodiment, and elements identical or similar to the first embodiment of the invention will not be described again.

In this second embodiment of the invention, the litter box includes the cylinder 102 arranged in the frame 101 and covered with the lid 142. The cylinder 102 is advantageously manufactured from two assembled half-cylinders 102a and 102b, visible in FIG. 9.

The frame 101 has a different shape than the first embodiment, but allows the same functions to be performed. This shape is esthetically different, but also allows certain technical functions to be fulfilled. In particular, the left-hand side wall 145 has a semi-cylindrical shape substantially following the cylinder 102, and has internal support rails 150a and 150b on which the cylinder 102 rests and which accompany its rotation by sliding of the cylinder on the rails. A rail portion 151a visible in FIG. 10 allows the cylinder 102 to be held in place in the frame 101. When the frame 101 and the lid 142 are each designed by molding, the rail arranged in the inner surface of the frame 101 each form a groove 150a', 150b' on the outer surface of the frame 101 which may be extended all around the frame 101 and the lid 142, in particular on the left-hand side wall 145, the right-hand side wall 109, the top wall of the lid and the bottom wall of the frame, as represented here.

Figure 9:
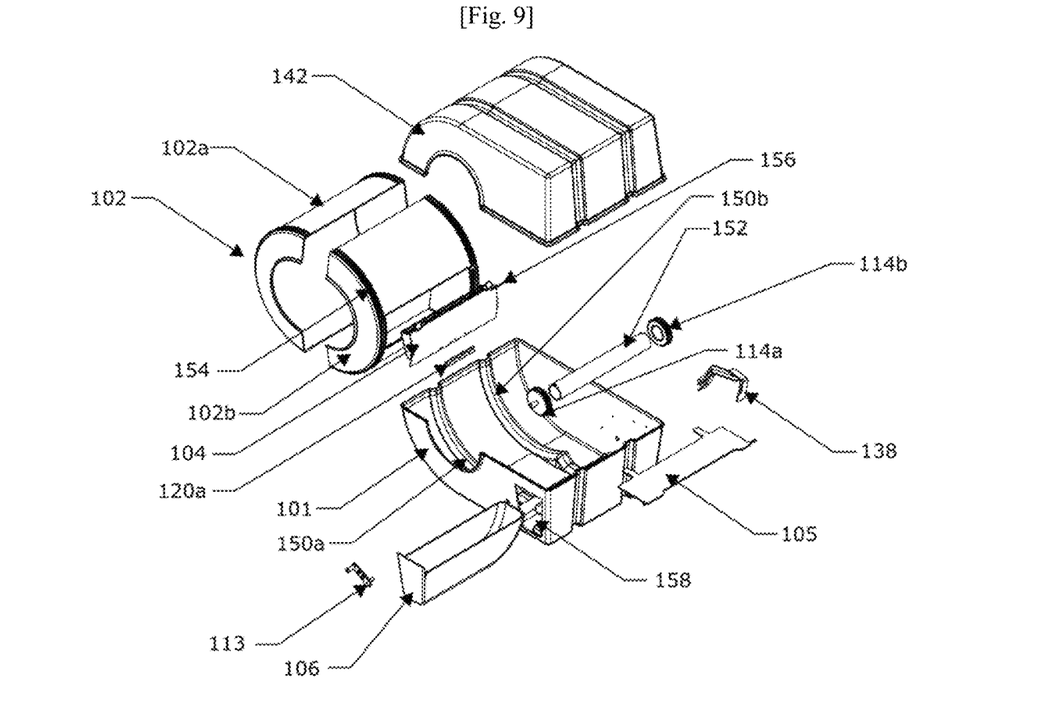
FIG. 9 represents a schematic exploded perspective view of a litter box according to a second embodiment of the invention.
Figure 10:
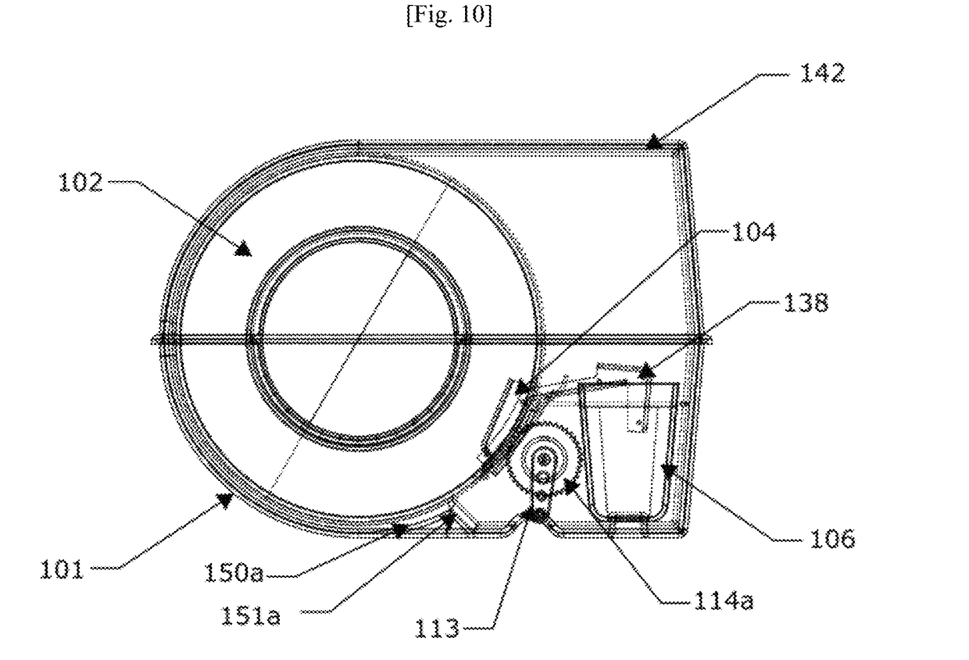
FIG. 10 represents a schematic transparent front view of a litter box according to a second embodiment of the invention.

The cylinder 102 is also held in part by rotation means formed by a cylindrical support 152 and two toothed wheels 114a and 114b replacing the roller of the first embodiment. The cylindrical support 152 extends from the front wall 107 to the rear wall of the litter box and is attached to the walls.

The cylindrical support thus forms a holding and guiding roller and allows both support and rotation of the cylinder. The cylindrical support has an axis of rotation parallel to the axis of rotation of the cylinder 102.

In this embodiment, the cylinder is held by the cylindrical support and the notch as described in the first embodiment is not required, but may be present all the same to form an additional support, in particular one close to the cylinder's axis of rotation, or for esthetic purposes.

The cylindrical support 152 is configured to be rotated by a crank handle 113, which is preferably removable, allowing rotation of the toothed wheels 114a and 114b by interaction with toothed portions 154 arranged on the cylinder 102. Alternatively, the cylinder includes a single toothed portion, for example arranged in the middle of the cylinder and interacting with a single toothed wheel of the cylindrical support.

Alternatively, the crank handle 113 may be replaced with an electric motor, arranged at the base of at least one of the cylindrical supports or around the cylindrical support. The electric motor may in particular be a conventional electric motor or a programmable electric motor associated with an electronic control, for example an integrated electronic control programmable in situ, or programmable remotely, for example via a smartphone, personal computer, tablet computer or equivalent. The electric motor may notably be a start/stop (ON/OFF) motor, or programmable over a rotation speed range as required.

According to another embodiment, not shown, the cylinder is alternatively held by at least two cylindrical supports, each extending from the front wall to the rear wall of the frame, beneath the cylinder, and including means for attachment to the front and rear walls. The cylindrical supports thus form holding and guiding rollers and allow both support and rotation of the cylinder. The cylindrical supports each have an axis of rotation parallel to the axis of rotation of the cylinder. Preferably, the cylindrical supports each have at least one toothed portion arranged to interact with a toothed portion arranged on the periphery of the cylinder, so that rotation of the cylindrical supports causes rotation of the cylinder, and/or conversely so that rotation of the cylinder causes rotation of the cylindrical supports. A crank handle as described previously may advantageously be attached to the base of one of the cylindrical supports so as to allow rotation of the latter, thereby rotating the cylinder to the same effect as the embodiment described.

In the same manner as in the first embodiment, rotation of the cylinder 102 drives an opening and closing mechanism for the hatch 104 including the grid 103, so as to discharge any droppings into the tank 106. The hatch 104 opens and closes by pivoting around the hinge 120a. The lid 105 of the tank and the hatch 104 are opened as the hatch 104 passes into the tank, by means of a rod 156 of the hatch 104 which is guided in a cam 138. When the tank 106 is full, it may be removed via an aperture 158 in the front wall 107 of the frame 101. The rod 156 and the cam 138 form hatch guide means coupled to the harrow.

Non-substantial modifications which would be obvious to a person skilled in the art to the use or manufacture for which the patent is here required, without altering the original provisions, would be mere technical equivalents and also fall within the scope of the present invention.

Of note, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", and/or "including," when used in this specification, specify the presence of stated features, integers, steps, operations, elements, and/or components, but do not preclude the presence or addition of one or more other features, integers, steps, operations, elements, components, and/or groups thereof.

As well, the corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

The invention claimed is:

1. A litter box for animals incorporating a cleaning device, the litter box comprising:
   a cylindrical chamber intended to receive litter, perforated with an access means for the animal, rotating on a frame, the rotation being generated by a rotation means actuated by a means for controlling said rotation means,
   said chamber comprising a droppings collection means coupled to a hatch provided with a locking and unlocking means interdependent on a means for controlling the unlocking of said hatch and a means for guiding the hatch coupled to the means for collecting droppings toward a tank for receiving droppings.

2. The litter box as claimed in claim 1, wherein the tank comprises a lid articulated on a hinge on one of its lengths and provided with an aperture guide on the other length, said guide being located on the axis of rotation of the means for locking and unlocking the hatch and being pushed by the latter when they come into contact so as to lift and open the lid of the tank.

3. The litter box as claimed in claim 1, wherein the frame is provided with means for controlling the locking of the means for locking and unlocking of the hatch, said locking and unlocking means being moreover provided with additional locking means.

4. The litter box as claimed in claim 1, wherein the droppings collection means comprises litter passage means complemented by a means for modulating the width of said litter passage means.

5. The litter box as claimed in claim 1, further comprising a covering means and a transport means.

6. The litter box as claimed in claim 1, wherein the rotation means comprise at least one cylindrical support with an axis of rotation parallel to the axis of rotation of the cylindrical chamber, configured to support the chamber and so that rotation of at least one cylindrical support results in rotation of the chamber.

7. The litter box as claimed in claim 1, wherein the means for controlling the rotation means comprise a manual, preferably removable, crank handle.

8. The litter box as claimed in claim 1, wherein the means for controlling the rotation means comprise an electric motor.

9. The litter box as claimed in claim 8, wherein the electric motor is a programmable electric motor.

10. The litter box as claimed in claim 1, wherein the means for controlling the rotation means are removable and in that the litter box is configured to allow manual changing of the means for controlling the rotation means between two rotations of the cylindrical chamber.

* * * * *